(12) United States Patent
Jin et al.

(10) Patent No.: US 12,405,964 B2
(45) Date of Patent: Sep. 2, 2025

(54) DATA PROCESSING SYSTEM AND DATA PROCESSING METHOD

(71) Applicants: DIGIWIN CO., LTD., Shanghai (CN); DATA SYSTEMS CO., LTD., New Taipei (TW)

(72) Inventors: Xu Jin, Shanghai (CN); Guoxin Sun, Shanghai (CN)

(73) Assignees: DIGIWIN CO., LTD., Shanghai (CN); DATA SYSTEMS CO., LTD., New Taipei (TW)

( * ) Notice: Subject to any disclaimer, the term of this patent is extended or adjusted under 35 U.S.C. 154(b) by 0 days.

(21) Appl. No.: 18/486,139

(22) Filed: Oct. 12, 2023

(65) Prior Publication Data

US 2025/0036647 A1 Jan. 30, 2025

(30) Foreign Application Priority Data

Jul. 24, 2023 (CN) .......................... 202310917778.8

(51) Int. Cl.
*G06F 16/25* (2019.01)
*G06F 16/28* (2019.01)
*G06N 5/02* (2023.01)

(52) U.S. Cl.
CPC .......... *G06F 16/254* (2019.01); *G06F 16/285* (2019.01); *G06N 5/02* (2013.01)

(58) Field of Classification Search
CPC ....... G06F 16/254; G06F 16/285; G06N 5/02; G06N 5/022; G06N 7/01; G06N 20/00
See application file for complete search history.

(56) References Cited

U.S. PATENT DOCUMENTS

| | | | | |
|---|---|---|---|---|
| 11,151,179 B2* | 10/2021 | Li | ........................ | G06F 16/335 |
| 11,250,042 B2* | 2/2022 | Chang | ................... | G06F 16/313 |
| 11,556,510 B1* | 1/2023 | Hanson | ............... | G06F 16/2379 |
| 2019/0065576 A1* | 2/2019 | Peng | ..................... | G06F 16/285 |
| 2020/0286602 A1* | 9/2020 | Yang | ..................... | G06N 5/022 |
| 2021/0073216 A1* | 3/2021 | Chang | ............... | G06F 16/24573 |
| 2021/0342783 A1* | 11/2021 | Pasala | .................... | G06N 5/022 |
| 2022/0067590 A1* | 3/2022 | Georgopoulos | ...... | G06F 40/279 |
| 2022/0093268 A1* | 3/2022 | Li | .......................... | G16H 10/60 |

(Continued)

*Primary Examiner* — Kris E Mackes
(74) *Attorney, Agent, or Firm* — JCIPRNET

(57) ABSTRACT

A data processing system and a data processing method are provided. The data processing system includes a processor and a storage device. The storage device stores a data processing module, a feature processing module and a classification conversion module. The processor is electrically connected to the storage device, and executes the data processing module, the feature processing module and the classification conversion module. The data processing module generates summary data according to multiple form data. The data processing module performs feature index calculation on the summary data to generate feature index data. The data processing module preprocesses the feature index data to generate a sample label data set. The feature processing module generates a training data set based on the sample label data set. The classification conversion module builds a classification model based on the training data set, and builds a structured semantic knowledge base based on the classification model.

16 Claims, 3 Drawing Sheets

(56) References Cited

U.S. PATENT DOCUMENTS

2022/0114483 A1* 4/2022 Sabharwal .......... G06F 16/9536
2022/0171786 A1* 6/2022 Du ....................... G06F 16/254
2022/0198445 A1* 6/2022 Jones ................... G06Q 20/389
2022/0207483 A1* 6/2022 Agarwal ............... H04L 51/212
2022/0417573 A1* 12/2022 Takahashi ........... H04N 21/2401
2024/0412103 A1* 12/2024 Subber .................. G16H 50/20

* cited by examiner

```
"condition":{
"paramater":"order_delivery",
"LogicalJudgmentSymbol":"LessAndEqueThan",
"LogicalValue":12,
"consequence": "No material chasing required"
}
```
— 400

FIG. 4

DATA PROCESSING SYSTEM AND DATA PROCESSING METHOD

CROSS-REFERENCE TO RELATED APPLICATION

This application claims the priority benefit of China application serial no. 202310917778.8, filed on Jul. 24, 2023. The entirety of the above-mentioned patent application is hereby incorporated by reference herein and made a part of this specification.

BACKGROUND

Technical Field

The disclosure relates to a digital system, and in particular relates to a data processing system and a data processing method.

Description of Related Art

Generally speaking, in the process of suppliers fulfilling their contracts, enterprise clients need to carry out material chasing in appropriate scenarios to ensure timely and sufficient delivery of materials. However, in the complex production process, it is no longer possible to accurately and efficiently confirm material chasing by human judgment. Although there are currently existing digital business systems that may automate business processes, traditional digital business systems require complex logic design and consume a large amount of data storage space and computing resources in order to realize the prediction function of material chasing in the production process.

SUMMARY

A data processing system and a data processing method, which may effectively and automatically build a structured semantic knowledge base, are provided in the disclosure.

According to an embodiment of the disclosure, the data processing system of the disclosure includes a storage device and a processor. The storage device is configured to store a data processing module, a feature processing module, and a classification conversion module. The processor is electrically connected to the storage device, and is configured to execute the data processing module, the feature processing module, and the classification conversion module. The data processing module generates summary data according to multiple form data. The data processing module performs feature index calculation on the summary data to generate feature index data, and the data processing module preprocesses the feature index data to generate a sample label data set. The feature processing module generates a training data set based on the sample label data set. The classification conversion module builds a classification model based on the training data set, and builds a structured semantic knowledge base based on the classification model.

According to an embodiment of the disclosure, the data processing method of the disclosure includes the following operation. A data processing module is executed through a processor to generate summary data according to multiple form data. The data processing module is executed through the processor to perform feature index calculation on the summary data to generate feature index data. The data processing module is executed through the processor to preprocess the feature index data to generate a sample label data set. A feature processing module is executed through the processor to generate a training data set according to the sample label data set. A classification conversion module is executed through the processor to build a classification model according to the training data set. The classification conversion module is executed through the processor to build a structured semantic knowledge base according to the classification model.

Based on the above, the data processing system and data processing method of the disclosure may perform data processing, feature processing, and classification conversion on the form data to build a structured semantic knowledge base, and building the structured semantic knowledge base may be used for the system to chase materials according to the real-time business data generated by the workflow.

In order to make the above-mentioned features and advantages of the disclosure comprehensible, embodiments accompanied with drawings are described in detail below.

BRIEF DESCRIPTION OF THE DRAWINGS

FIG. 4 is a schematic diagram of a structured rule according to an embodiment of the disclosure.

DETAILED DESCRIPTION OF DISCLOSED EMBODIMENTS

Figure 1:
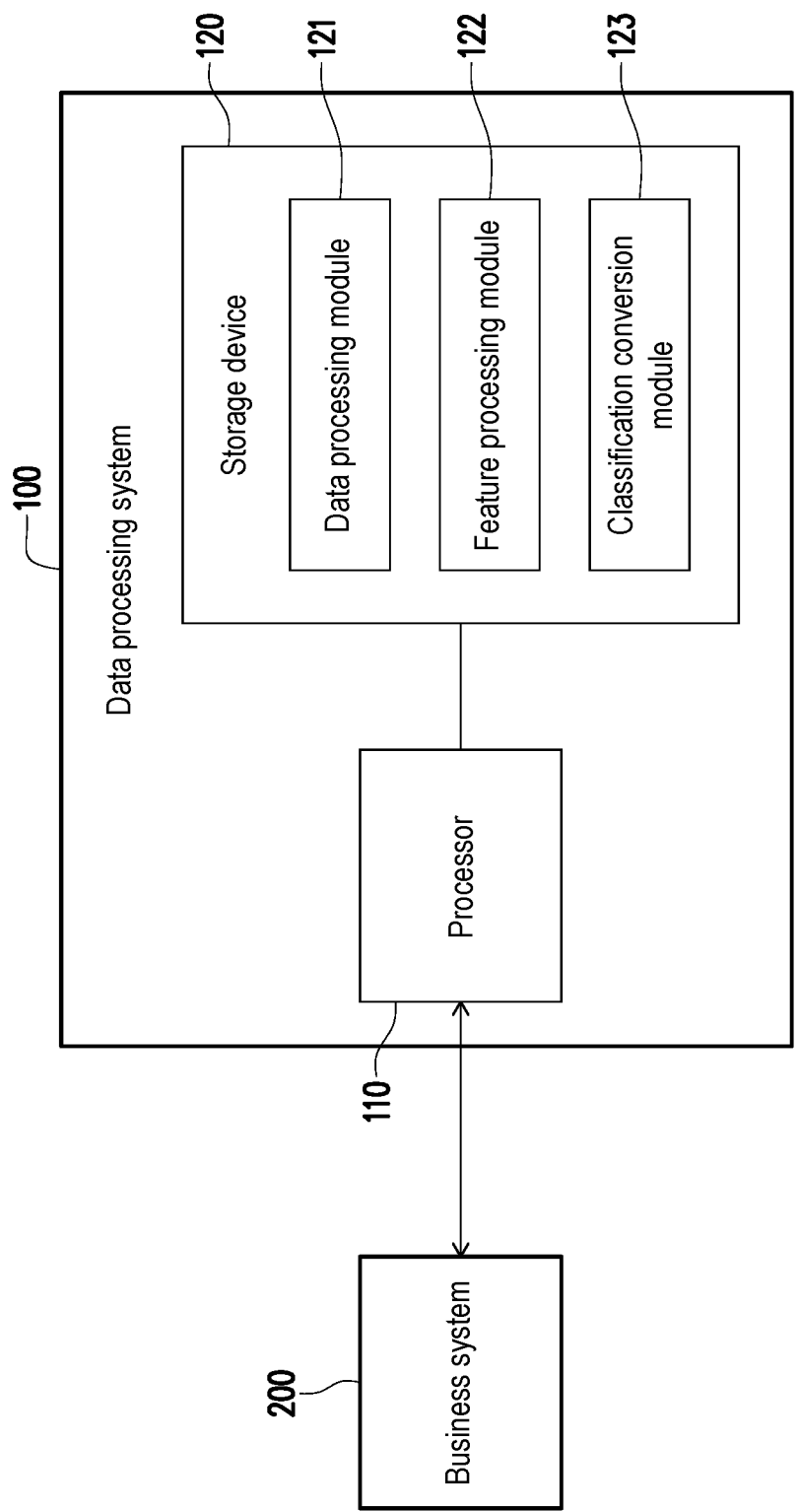
FIG. 1 is a schematic diagram of a data processing system according to an embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

FIG. 1 is a schematic diagram of a data processing system according to an embodiment of the disclosure. Referring to FIG. 1, a data processing system 100 includes a processor 110 and a storage device 120. The processor 110 is electrically connected to the storage device 120. In this embodiment, the data processing system 100 may communicate with the business system 200. The processor 110 may obtain relevant business data from the business system 200. The storage device 120 may store relevant algorithms, programs and/or software of the data processing module 121, the feature processing module 122 and the classification conversion module 123, and may store or temporarily store data generated during the data processing.

In this embodiment, the processors 110 may be, for example, a system on a chip (SOC), or may include, for example, a central processing unit (CPU) or other programmable general-purpose or special-purpose microprocessor, a digital signal processor (DSP), a programmable controller, an application specific integrated circuit (ASIC), a programmable logic device (PLD), or other similar processing devices or a combination of these devices. In this embodiment, the storage device 120 may be, for example, dynamic random access memory (DRAM), flash memory, or non-volatile random access memory (NVRAM), etc.

In this embodiment, the processor 110 may obtain multiple historical form data from an external database, and may build a structured semantic knowledge base according to the historical form data, in which the building of the structured semantic knowledge base may be knowledge graph data.

Moreover, during the business process performed by the business system 200, the processor 110 may automatically perform business prediction according to the knowledge graph data, and automatically generate corresponding prediction information. During the business process, the data processing system 100 may generate (restore) corresponding condition data through the knowledge map data to compare with real-time business data and realize the corresponding prediction function. In this regard, the data processing system 100 does not need to store complex and large amounts of original judgment logic data, and may effectively save data storage space and computing resources. In this embodiment, the business system 200 may be an enterprise resource planning (ERP) system.

Figure 2:
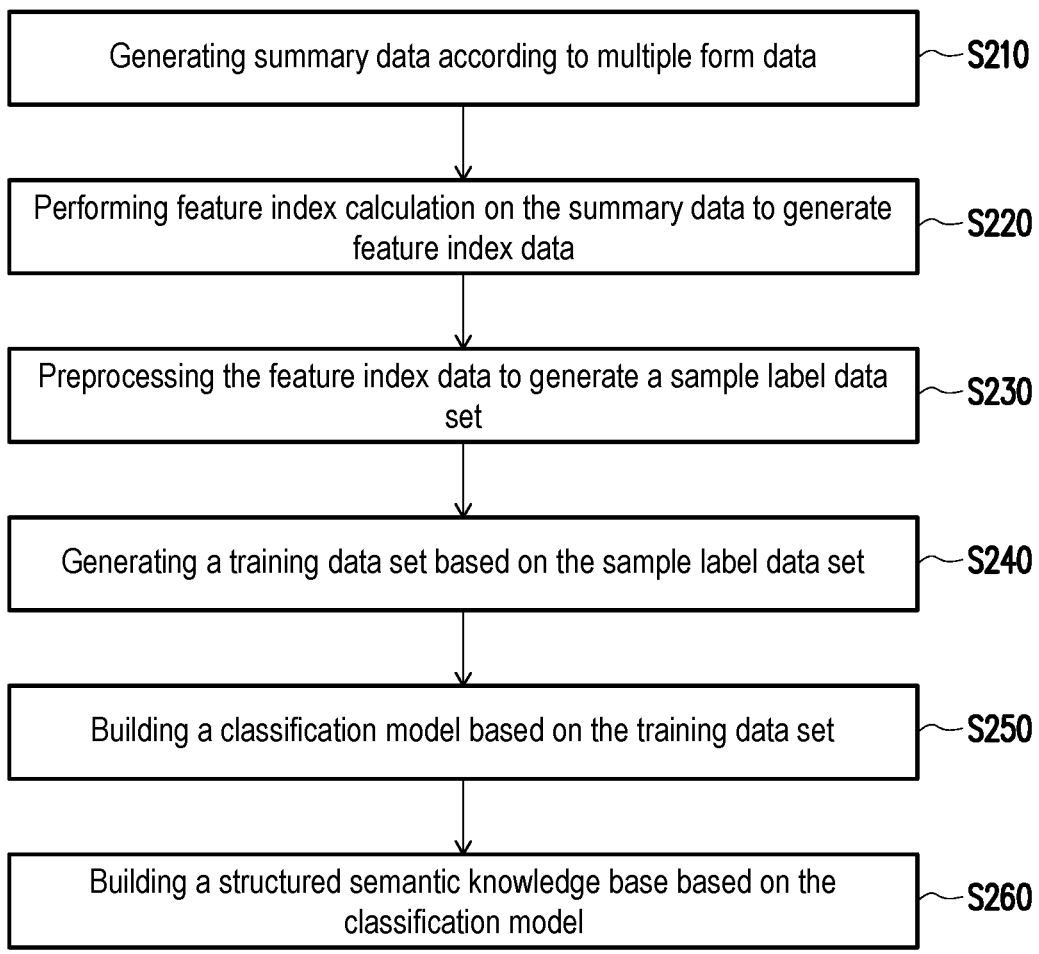
FIG. 2 is a flowchart of a data processing method according to an embodiment of the disclosure.

FIG. 2 is a flowchart of a data processing method according to an embodiment of the disclosure. Referring to FIG. 1 and FIG. 2, the data processing system 100 may execute the following steps S210 to S260. The data processing system 100 may read the historical database or the business system 200 to, for example, obtain relevant historical order information and supplier information, but the disclosure is not limited thereto. In step S210, the processor 110 may execute the data processing module 121 to generate summary data according to multiple form data. In this embodiment, the data processing module 121 may generate summary data according to the association relationship between the multiple form data, in which the form data may include purchase order data, delivery receipt data and supplier data. In step S220, the processor 110 may execute the data processing module 121 to perform feature index calculation on the summary data to generate feature index data. In this embodiment, the feature index calculation is an ETL (extract, transform, load) engineering calculation. For example, the processor 110 may calculate relevant features such as the delay time, the delivery time, the number of orders from the supplier in the past month, the number of inspections and returns in the past month, the average delivery time in the past month, the number of orders in the past three months, the number of inspections and returns in the past three months, and/or the average delivery time in the past three months, etc., according to the summary data and related business logic, so as to generate the feature index data.

In step S230, the processor 110 may execute the data processing module 121 to preprocess the feature index data to generate a sample label data set. In this embodiment, the data processing module 121 may perform outlier elimination and missing value filling processing on the feature index data. In addition, the data processing module 121 further fills in the average value of the corresponding feature attribute value, and performs labeling processing, so as to generate the sample label data set. For example, if the quantity delivered by the supplier meets the quantity required to be purchased, the label is set to 1, otherwise the label is set to 0.

In step S240, the processor 110 may execute the feature processing module 122 to generate a training data set according to the sample label data set. In this embodiment, the feature processing module 122 may perform analysis of variance (ANOVA) and feature binarization processing on the sample label data set to generate the training data set. Specifically, the feature processing module 122 may select features that are more correlated with the category through analysis of variance. The feature processing module 122 may sort all the values of the feature in ascending order, and sequentially calculate the average value between every two values as all candidate division points. The feature processing module 122 may set the candidate division point with the largest information gain of the data set as the final division point of this feature, and the feature values smaller than or equal to this division point are regarded as one category, and the feature values greater than this division point are regarded as another category. In other words, the feature processing module 122 may implement feature binarization and generate a training data set.

In step S250, the processor 110 may execute the classification conversion module 123 to build a classification model according to the training data set. In this embodiment, the classification conversion module 123 may include a (naive) Bayes classifier, and the Bayes classifier may be configured to build a Bayes classification model according to the training data set. For example, when the label is 0 or 1, the processor 110 may calculate the probability distribution of each feature over each interval. Assuming that the category variable of data set D is set to c, the division point of feature A is a, and the division point of feature B is b, the processor 110 needs to calculate $p(A<=a|c=0)$, $p(A<=a|c=1)$, $p(A>a|c=0)$, $p(A>a|c=1)$, $p(B<=b|c=0)$, $p(B<=b|c=1)$, $p(B>b|c=0)$, and $p(B>b|c=1)$. Moreover, when the probability is 0, the processor 110 may use a Laplace correction method to perform correction. The processor 110 may obtain the magnitude relationship among the four sets of $p(c=0|A<=a,B<=b)p(c=0)$ and $p(c=1|A<=a,B<=b)p(c=1)$, $p(c=0|A<=a,B>b)p(c=0)$ and $p(c=1|A<=a,B>b)p(c=1)$, $p(c=0|A>a,B<=b)p(c=0)$ and $p(c=1|A>a,B<=b)p(c=1)$, $p(c=0|A>a,B>b)p(c=0)$ and $p(c=1|A>a,B>b)p(c=1)$, and may obtain category labels of the four situations according to the probabilities.

In step S260, the processor 110 may execute the classification conversion module 123 to build a structured semantic knowledge base according to the classification model. In this embodiment, the structured semantic knowledge base may be a knowledge graph data structure. Specifically, the classification conversion module 123 may read multiple classification rules from the classification model to generate multiple triplet data. The classification conversion module 123 may combine the multiple triplet data to build the structured semantic knowledge base. For example, continuing the above example, assuming that the probability "$p(c=0|A<=a,B<=b)$" is greater than "$p(c=1|A<=a,B<=b)$", then the category label in this situation is determined to be 0, and the triplet data of the following form (A & B, A<=a and BC=b, 0) may be obtained. In addition, triple data may be combined in the following situations, assuming that the data of triplet 1 includes: (special & o_order & td_s_success, special<=0.383 and o_order<=555.23 and td_s_success<=202.942, 0). The data of triplet 2 includes: (special&o_order & td_s_success, special<=0.383 and o_orde<=555.23 and td_s_success>202.942, 0). In this regard, the classification conversion module 123 may combine the data of triplet 1 and the data of triplet 2 to generate the triplet data after fusion: (special & o_order, special<=0.383 and o_order<=555.23, 0). In this regard, the classification conversion module 123 may determine whether the factor data and category labels in the data of the triplet 1 and the data of the triplet 2 are the same. If they are the same, the classification conversion module 123 may combine the aforementioned data of triplet 1 and the data of triplet 2. In other words, the method of generating knowledge map data in this disclosure may also effectively reduce the amount of redundant data. The multiple triplet data respectively includes factor data, condition data and conclusion data.

For another example, first, the data processing module 121 may associate the purchase order table with the delivery receipt table according to the table fields of the purchase order category, purchase order number, and serial number to obtain the first summary data, and further associate the first summary data with the manufacturer basic data table using the table fields of the manufacturer code to obtain the second summary data. The data processing module 121 may calculate each piece of data in the second summary data to obtain the corresponding delivery time (order_delivery, date of inspection and acceptance to purchase date), whether the delivery is on time (on_time, whether the delivery confirmation date is greater than the date of receipt (if so, then the value of the feature index is 1, if not, the value of the feature index is 0)), the delay time (delay_time, the date of receipt to the delivery confirmation date) and other feature indexes, and the feature index data as shown in Table 1 below are obtained.

TABLE 1

| order_delivery | on_time | delay_time |
|---|---|---|
|  | 1 | 3 |
| 5 | 1 | 56 |
| 19 | 1 |  |
| 96 | 1 | −20 |
| −74 | 1 | 12765421 |

Next, the data processing module 121 may eliminate abnormal data in the feature index data and fill in missing values. The abnormal data is, for example, the delay time "12765421" in Table 1 above. In this regard, if the delivery time is negative and/or the delay time is too long, it is abnormal data. The data processing module 121 may calculate the average value to fill in missing values. The data processing module 121 may compare the fields purchase quantity and delivery quantity in the second summary data. If the delivery quantity is greater than or equal to the purchase quantity, the label is set to 1, otherwise the label is set to 0. Therefore, the data processing module 121 may generate sample label data as shown in Table 2 below.

TABLE 2

| order_delivery | on_time | delay_time | label |
|---|---|---|---|
| 40 | 1 | 3 | 0 |
| 5 | 1 | 56 | 1 |
| 19 | 1 | 13 | 0 |
| 96 | 1 | −20 | 1 |

Next, the feature processing module 122 selects more relevant features through analysis of variance for the three features in the sample label data in Table 2, such as order_delivery, on_time, and delay-time. The feature processing module 122 may first perform maximum and minimum normalization on the value under each feature, calculate the variation number corresponding to each feature, set the threshold t as 0.001, and filter out the features with the variation number greater than t as the order_delivery and delay-time, so as to obtain the data in Table 3 below.

TABLE 3

| order_delivery | delay_time | label |
|---|---|---|
| 40 | 3 | 0 |
| 5 | 56 | 1 |
| 19 | 13 | 0 |
| 96 | −20 | 1 |

The feature processing module 122 may discretize the continuous numerical features (i.e., order_delivery and delay-time) in Table 3 above. Taking the processing of the feature "order_delivery" as an example, the feature processing module 122 may sort the feature values in ascending order to obtain 5, 19, 40, 96. Moreover, the feature processing module 122 may obtain three candidate division points 12, 29.5 and 68, and may calculate that the information gain obtained by dividing by the candidate point 12 is the greatest. Similarly, the feature "delay_time" may be divided by 8.5 to obtain the greatest information gain. Therefore, the feature processing module 122 may generate data (training data set) as shown in Table 4 below.

TABLE 4

| order_delivery | delay_time | label |
|---|---|---|
| >12 | <=8.5 | 0 |
| <=12 | >8.5 | 1 |
| >12 | >8.5 | 0 |
| >12 | >8.5 | 1 |

Then, according to the Table 4 above, the classification conversion module 123 may calculate the probability p(label=0)=0.5 and the probability p(label=1)=0.5. In addition, assuming that the features are independent, the processor 110 may calculate the probability "p(order_delivery<=12|label=0)=0.0", probability "p(order_delivery<=12|label=1)=0.5", probability "p(order_delivery>12|label=0)=1.0", probability "p(order_delivery>12|label=1)=0.5", probability "p(delay_time<=8.5|label=0)=0.5", Probability "p(delay_time<=8.5|label=1)=0.0", probability "p(delay_time>8.5|label=0)=0.5", and probability "p(delay_time>8.5|label=1)=1.0". The classification conversion module 123 adopts Laplace correction for the data with probability 0, while also correcting the probability p(label=0) and probability p(label=1). Therefore, the classification conversion module 123 may obtain the probability "p(order_delivery<=12|label=0)=1/(2+2)=0.25" and the probability "p(delay_time<=8.5|label=1)=1/(2+2)=0.25". In this way, the classification conversion module 123 may calculate the probability "p(lable=0|order_delivery<=12,delay_time<=8.5)<=>p(label=0)*p(order_delivery<=12|label=0)*p(delay_time<=8.5|label=0)=0.5*0.25*0.5=0.0625" and the probability "p(lable=1|order_delivery<=12,delay_time<=8.5)<=>p(label=1)*p(order_delivery<=12|label=1)*p(delay_time<=8.5|label=1)=0.5*0.5*1.0=0.25". Finally, according to Bayesian theorem, it may be known that "p(lable=1|order_delivery<=12, delay_time<=8.5)>p(lable=0|order_delivery<=12, delay_time<=8.5)", so it may be concluded that the classification rule is that when the sample satisfies "order_delivery<=12, delay_time<=8.5", the category label may be determined as 1. Similarly, it may be concluded that when the sample satisfies "order_delivery<=12, delay_time>8.5", the category label may be determined as 1. When the sample satisfies "order_delivery>12, delay_time<=8.5", the category label may be determined as 0. When the sample satisfies "order_delivery>12, delay_time>8.5", the category label may be determined as 1.

Then, the classification conversion module 123 may convert the above four rules into triplet data (i.e., data formed of factor data, condition data and conclusion data), which may be, for example, (order_delivery&delay_time, order_delivery<=12 and delay_time<=8.5, no material chasing required)", "(order_delivery&delay_time, order_delivery<=12 and delay_time>8.5, no material chasing required)", "(order_delivery&delay_time, order_delivery>12 and delay_time<=8.5, does not meet the purchase quantity, material chasing required)" and "(order_delivery&delay_time, order_delivery>12 and delay_time>8.5, no material chasing required)".

In addition, as another example, triple data may be combined if the following situations occur. For example, the triplet data includes a triplet data "(order_delivery&delay_time, order_delivery<=12 and delay_time<=8.5, no material chasing required)" and another triplet data "(order_delivery&delay_time, order_delivery<=12 and delay_time>8.5, no material chasing required)". In this regard, the classification conversion module 123 may combine the above two triplets data into "(order_delivery, order_delivery<=12, no material chasing required)". Finally, the classification conversion module 123 may store the triplet data "(order_delivery, order_delivery<=12, no material chasing required)" into the knowledge graph data, in which the factor data in this triplet data is "order_delivery", the condition data is "order_delivery<=12" and the conclusion data is "no material chasing required".

Figure 3:
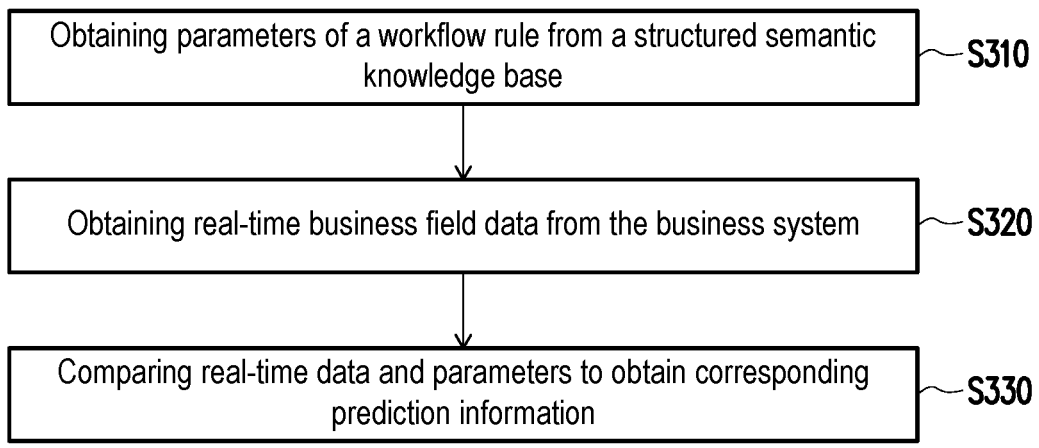
FIG. 3 is a flowchart of a prediction method according to an embodiment of the disclosure.

FIG. 3 is a flowchart of a prediction method according to an embodiment of the disclosure. FIG. 4 is a schematic diagram of a structured rule according to an embodiment of the disclosure. Referring to FIG. 1, FIG. 3, and FIG. 4, after the building of the knowledge graph data is completed, the data processing system 100 may perform the prediction operation in the following steps S310 to S330. In step S310, the processor 110 may obtain the parameters of the workflow rule from the structured semantic knowledge base. In step S320, the processor 110 may obtain real-time business field data from the business system 200. In step S330, the processor 110 may compare the real-time data with the parameters to obtain corresponding prediction information.

For example, during the execution of tasks by the business system 200, the processor 110 may convert the pre-stored knowledge map data as exemplified in the above-mentioned embodiments into a structured rule 400 of condition "condition" as shown in FIG. 4, in which the structured rule 400 may include the recorded parameter name ""paramater": "order_delivery"", the logical judgment symbol ""LogicalJudgmentSymbol":"LessAndEqueThan"", the logical value ""LogicalValue": 12" and the result when the condition is true" "consequence": "no material chasing required"". That is, the condition corresponding to the structured rule 400 is "order_delivery<=12".

In this regard, assuming that the data of the real-time business field "order_delivery" obtained by the processor 110 from the business system 200 is 11, the processor 110 may determine that the data of the real-time business field "order_delivery" meets the above conditions. Therefore, the processor 110 may obtain the conclusion data of "no material chasing required", and the processor 110 may reply the conclusion to the business system 200, so that the business system 200 may perform follow-up tasks and/or notify the user accordingly.

To sum up, the data processing system and data processing method of the disclosure may perform data processing on form data to automatically build knowledge graph data. During the process of executing tasks in the business system, the corresponding condition data may be generated through the knowledge map data, which may be used to determine whether the real-time business data generated by the business system in the process of executing tasks meets the conditions, and thereby realizing the corresponding prediction function.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. A data processing system, comprising:
   a storage device, configured to store a data processing module, a feature processing module, and a classification conversion module; and
   a processor, electrically connected to the storage device, and configured to execute the data processing module, the feature processing module, and the classification conversion module,
   wherein the data processing module generates summary data according to an association relationship between a plurality of form data, the data processing module performs feature index calculation on the summary data to generate feature index data, wherein the feature index calculation is an ETL (extract, transform, load) engineering calculation, and the data processing module preprocesses the feature index data to generate a sample label data set,
   wherein the feature processing module generates a training data set according to the sample label data set,
   wherein the classification conversion module builds a classification model according to the training data set, and builds a structured semantic knowledge base according to the classification model,
   wherein when the classification conversion module builds the structured semantic knowledge base, the classification conversion module reads a plurality of classification rules from the classification model to generate a plurality of triplet data, and the classification conversion module determines whether a factor data and category labels in a first triplet data are same as those of the second triplet data,
   wherein when the classification conversion module determines the factor data and category labels in the first triplet data are same as those of the second triplet data, the classification conversion module combines the first triplet data and the second triplet data to generate fused triplet data in the structured semantic knowledge base, wherein an amount of data of the fused triplet data is less than a total amount of data of the first triplet data and the second triplet data.

2. The data processing system according to claim 1, wherein the processor 110 obtains parameters of a workflow rule from the structured semantic knowledge base, obtains real-time business field data from a business system, and compares the real-time business field data with the parameters to obtain corresponding prediction information.

3. The data processing system according to claim 2, wherein the form data comprises purchase order data, delivery receipt data, and supplier data, and the prediction information is a material chasing information.

4. The data processing system according to claim 1, wherein the data processing module performs outlier elimination and missing value filling processing on the feature index data, wherein the data processing module fills in an average value of corresponding feature attribute value, and performs labeling processing to generate the sample label data set.

5. The data processing system according to claim 1, wherein the feature processing module performs analysis of variance and feature binarization processing on the sample label data set to generate the training data set.

6. The data processing system according to claim 1, wherein the classification conversion module comprises a Bayes classifier, and the Bayes classifier builds the classification model according to the training data set.

7. The data processing system according to claim 1, wherein the structured semantic knowledge base is a knowledge graph data structure.

8. The data processing system according to claim 1, wherein the triplet data respectively comprises factor data, condition data and conclusion data.

9. A data processing method, comprising:
executing a data processing module through a processor to generate summary data according to an association relationship between a plurality of form data;
executing the data processing module through the processor to perform feature index calculation on the summary data to generate feature index data, wherein the feature index calculation is an ETL (extract, transform, load) engineering calculation;
executing the data processing module through the processor to preprocess the feature index data to generate a sample label data set;
executing a feature processing module through the processor to generate a training data set according to the sample label data set;
executing a classification conversion module through the processor to build a classification model according to the training data set; and
executing the classification conversion module through the processor to build a structured semantic knowledge base according to the classification model,
wherein building the structured semantic knowledge base comprises:
reading a plurality of classification rules from the classification model to generate a plurality of triplet data,
determining whether a factor data and category labels in a first triplet data are same as those of the second triplet data, and when the factor data and category labels in the first triplet data are same as those of the second triplet data to generate fused triplet data in the structured semantic knowledge base,
wherein an amount of data of the fused triplet data is less than a total amount of data of the first triplet data and the second triplet data.

10. The data processing method according to claim 9, further comprising:
obtaining parameters of a workflow rule from the structured semantic knowledge base through the processor;
obtaining real-time business field data from a business system through the processor; and
comparing the real-time business field data with the parameters through the processor to obtain corresponding prediction information.

11. The data processing method according to claim 10, wherein the form data comprises purchase order data, delivery receipt data, and supplier data, and the prediction information is a material chasing information.

12. The data processing method according to claim 9, wherein generating the sample label data set comprises:
performing outlier elimination and missing value filling processing on the feature index data, filling in an average value of corresponding feature attribute value, and performing labeling processing to generate the sample label data set.

13. The data processing method according to claim 9, wherein generating the training data set comprises:
performing analysis of variance and feature binarization processing on the sample label data set to generate the training data set.

14. The data processing method according to claim 9, wherein the classification conversion module comprises a Bayes classifier, and the Bayes classifier builds the classification model according to the training data set.

15. The data processing method according to claim 9, wherein the structured semantic knowledge base is a knowledge graph data structure.

16. The data processing method according to claim 9, wherein the triplet data respectively comprises factor data, condition data and conclusion data.

* * * * *